(12) United States Patent
Miwa et al.

(10) Patent No.: US 8,689,900 B2
(45) Date of Patent: Apr. 8, 2014

(54) ROTARY TOOL

(75) Inventors: Tatsuya Miwa, Maibara (JP); Masaki Ikeda, Hikone (JP)

(73) Assignee: Panasonic Corporation, Osaka (JP)

( * ) Notice: Subject to any disclaimer, the term of this patent is extended or adjusted under 35 U.S.C. 154(b) by 403 days.

(21) Appl. No.: 12/926,506

(22) Filed: Nov. 23, 2010

(65) Prior Publication Data

US 2011/0120738 A1 May 26, 2011

(30) Foreign Application Priority Data

Nov. 25, 2009 (JP) .................................. 2009-268071

(51) Int. Cl.
*B23Q 5/00* (2006.01)

(52) U.S. Cl.
USPC ............... 173/176; 173/2; 173/179; 173/181; 173/217

(58) Field of Classification Search
USPC ................. 173/2, 176, 178, 179, 181, 217
See application file for complete search history.

(56) References Cited

U.S. PATENT DOCUMENTS

| | | | | |
|---|---|---|---|---|
| 2,339,829 | A * | 1/1944 | Youhouse | 310/68 C |
| 3,263,429 | A * | 8/1966 | Edison | 74/583 |
| 3,299,781 | A * | 1/1967 | Law | 418/100 |
| 3,504,480 | A * | 4/1970 | Copcutt et al. | 96/21 |
| 3,829,703 | A * | 8/1974 | Wilkie | 307/18 |
| 3,967,261 | A * | 6/1976 | Fudaley | 173/2 |
| 4,109,475 | A * | 8/1978 | Schnell | 405/228 |
| 5,170,358 | A * | 12/1992 | Delio | 700/177 |
| 5,174,387 | A * | 12/1992 | Arndt et al. | 173/1 |
| 5,418,339 | A * | 5/1995 | Bowen et al. | 181/230 |
| 5,984,020 | A * | 11/1999 | Meyer et al. | 173/2 |
| 6,237,698 | B1 * | 5/2001 | Carrier et al. | 173/2 |
| 6,253,860 | B1 * | 7/2001 | Poysti et al. | 173/1 |
| 6,286,609 | B1 * | 9/2001 | Carrier et al. | 173/1 |
| 6,510,902 | B1 * | 1/2003 | Prokop et al. | 173/1 |
| 6,536,536 | B1 * | 3/2003 | Gass et al. | 173/2 |

(Continued)

FOREIGN PATENT DOCUMENTS

| | | |
|---|---|---|
| EP | 1 825 964 | 8/2007 |
| EP | 1825964 A1 * | 8/2007 |
| JP | 3391951 | 1/2003 |
| JP | 2009-131934 | 6/2009 |

OTHER PUBLICATIONS

Extended European search report dated Feb. 23, 2012.

(Continued)

*Primary Examiner* — Thanh Truong
*Assistant Examiner* — Eyamindae Jallow
(74) *Attorney, Agent, or Firm* — Bacon & Thomas, PLLC

(57) ABSTRACT

A rotary tool includes an externally operable operation switch; a motor serving as a power source; a power transfer block for transferring the rotation of the motor; a load detection unit for detecting an amount of load of the motor; and a control unit for controlling the motor. The control unit is configured to perform an operation control by which the motor is controlled so that a rotation speed of the motor is increased in proportion to the operation amount of the operation switch and a feedback control by which the rotation speed of the motor is controlled depending on the detection result of the load detection unit. The control unit inhibits the feedback control during the time when the operation amount of the operation switch is equal to or less than a threshold and performing the feedback control only when the operation amount of the operation switch is greater than the threshold.

13 Claims, 4 Drawing Sheets

(56) References Cited

U.S. PATENT DOCUMENTS

| | | | |
|---|---|---|---|
| 6,799,644 B2* | 10/2004 | Hoop et al. | 173/201 |
| 6,834,730 B2* | 12/2004 | Gass et al. | 173/2 |
| 7,036,703 B2* | 5/2006 | Grazioli et al. | 227/10 |
| 7,090,031 B2* | 8/2006 | Kaminski | 173/217 |
| 7,093,668 B2* | 8/2006 | Gass et al. | 173/2 |
| 7,121,358 B2* | 10/2006 | Gass et al. | 173/2 |
| 7,231,989 B2* | 6/2007 | Salminen et al. | 173/1 |
| 7,328,752 B2* | 2/2008 | Gass et al. | 173/2 |
| 7,665,540 B2* | 2/2010 | Gross et al. | 173/2 |
| 7,770,658 B2* | 8/2010 | Ito et al. | 173/1 |
| 7,777,612 B2* | 8/2010 | Sampson et al. | 340/426.1 |
| 7,882,899 B2* | 2/2011 | Borinato et al. | 173/176 |
| 8,210,273 B2* | 7/2012 | Suzuki et al. | 173/2 |
| 8,230,940 B2* | 7/2012 | Winkes | 173/1 |
| 8,286,723 B2* | 10/2012 | Puzio et al. | 173/1 |
| 8,313,012 B2* | 11/2012 | Shima et al. | 227/8 |
| 2003/0121685 A1* | 7/2003 | Yamamoto | 173/217 |
| 2003/0205393 A1* | 11/2003 | Hoop et al. | 173/2 |
| 2004/0050566 A1* | 3/2004 | Totsu | 173/2 |
| 2004/0159449 A1* | 8/2004 | Leitenberger et al. | 173/2 |
| 2005/0034881 A1* | 2/2005 | Berger et al. | 173/2 |
| 2005/0205275 A1* | 9/2005 | Kaminski | 173/2 |
| 2006/0081386 A1* | 4/2006 | Zhang et al. | 173/2 |
| 2008/0135268 A1* | 6/2008 | Tadokoro et al. | 173/2 |
| 2009/0205848 A1* | 8/2009 | Wilson et al. | 173/1 |
| 2010/0084150 A1* | 4/2010 | Suzuki et al. | 173/2 |
| 2010/0096151 A1* | 4/2010 | Ostling | 173/2 |
| 2010/0307782 A1* | 12/2010 | Iwata et al. | 173/1 |

OTHER PUBLICATIONS

The Japanese Office Action dated Jun. 11, 2013 and the English Summary thereof.

* cited by examiner

ROTARY TOOL

FIELD OF THE INVENTION

The present invention relates to a rotary tool with a feedback function.

BACKGROUND OF THE INVENTION

Conventionally, there has been proposed a rotary tool for rotationally driving a motor in proportion to the operation amount of an operation switch (or a trigger switch). The rotary tool is provided with a feedback function so that a work can be smoothly performed even if the load is changed depending on the variation of workpieces or the like. (see, e.g., Japanese Patent No. 3391951).

With the feedback function, the load applied to a motor is monitored to control the motor in such a way that the rotation speed of the motor is automatically increased in response to the increase of the load while the rotation speed of the motor is automatically reduced in response to the decrease of the load. The feedback function is employed to realize a smooth work.

In the rotary tool with a feedback function, however, there is posed a so-called cogging torque problem in that the tip (i.e., jaw) of the rotary tool rotates with jerkiness. The cogging torque is likely to generate, e.g., in case where a trigger switch is slightly pulled in in a load-free state and fixed as it is.

SUMMARY OF THE INVENTION

In view of the above, the present invention provides a rotary tool capable of realizing a smooth work though the use of a feedback function and capable of efficiently preventing generation of cogging torque.

In accordance with an embodiment of the invention, there is provided a rotary tool, including: an externally operable operation switch; a motor serving as a power source; a power transfer block for transferring the rotation of the motor; a load detection unit for detecting an amount of load of the motor; and a control unit for controlling the motor, wherein the control unit is configured to perform an operation control by which the motor is controlled so that a rotation speed of the motor is increased in proportion to the operation amount of the operation switch and a feedback control by which the rotation speed of the motor is controlled depending on the detection result of the load detection unit, the control unit inhibiting the feedback control during the time when the operation amount of the operation switch is equal to or less than a threshold and performing the feedback control only when the operation amount of the operation switch is greater than the threshold.

With the present rotary tool configured as above, use of the feedback control makes it possible to smoothly carry out a work even if the load of the motor is changed depending on the variation of workpieces. It is also possible to effectively prevent generation of cogging torque by inhibiting the feedback control during the time when the operation amount of the operation switch is in a range in which the cogging torque is likely to occur.

The rotary tool may further include a battery unit for supplying electric power to the motor and a residual power detection unit for detecting a residual power amount of the battery unit, the control unit being set not to perform the inhibition of the feedback control if the residual power amount detected by the residual power detection unit is greater than a threshold value.

By setting the control unit not to inhibit the feedback control when the residual power amount is in a level in which the cogging torque is hard to generate, it is possible to make the effect of assuring a smooth work through the feedback control highly compatible with the effect of preventing generation of the cogging torque.

The rotary tool may further include a temperature detection unit for detecting a temperature of the power transfer block, the control unit being set not to perform the inhibition of the feedback control if the temperature detected by the temperature detection unit is greater than a threshold temperature.

By setting the control unit not to inhibit the feedback control when the temperature is in a zone in which the cogging torque is hard to generate, it is possible to make the effect of assuring a smooth work through the feedback control highly compatible with the effect of preventing generation of the cogging torque.

The control unit may include a high-speed mode and a low speed mode in which a rotation speed of the motor is greater in the high-speed mode than in the low-speed mode for a same pulling amount of the operation switch, the control unit being set not to perform the inhibition of the feedback control when in the high-speed mode.

By setting the control unit not to inhibit the feedback control when the control unit in a mode in which the cogging torque is hard to generate, it is possible to make the effect of assuring a smooth work through the feedback control highly compatible with the effect of preventing generation of the cogging torque.

With the present invention, there is provided an advantageous effect in that a smooth work can be realized by using a feedback function and efficiently preventing generation of cogging torque.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Figure 1:
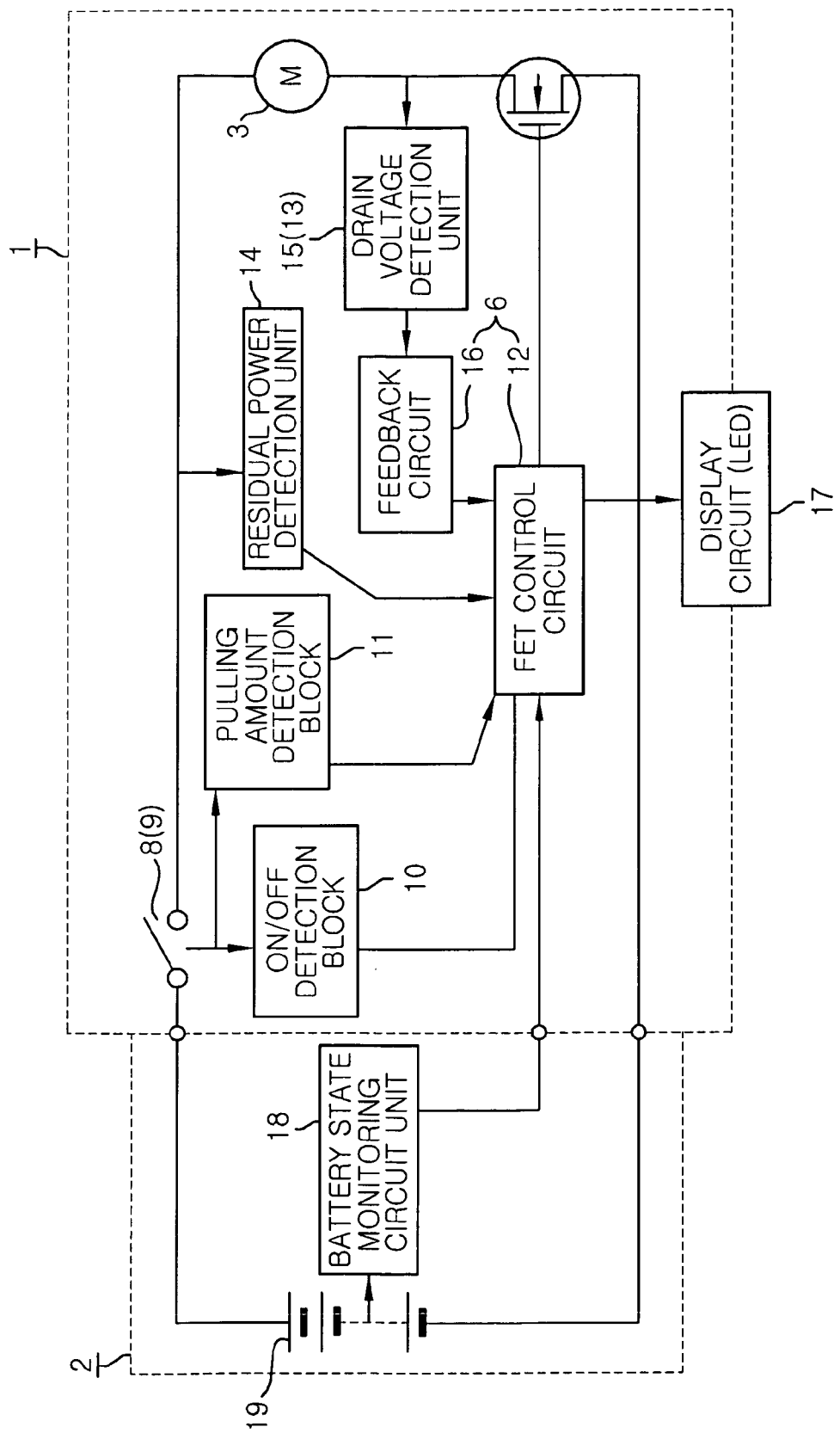
FIG. 1 is a circuit block diagram showing a rotary tool according to a first embodiment of the present invention.
Figure 2:
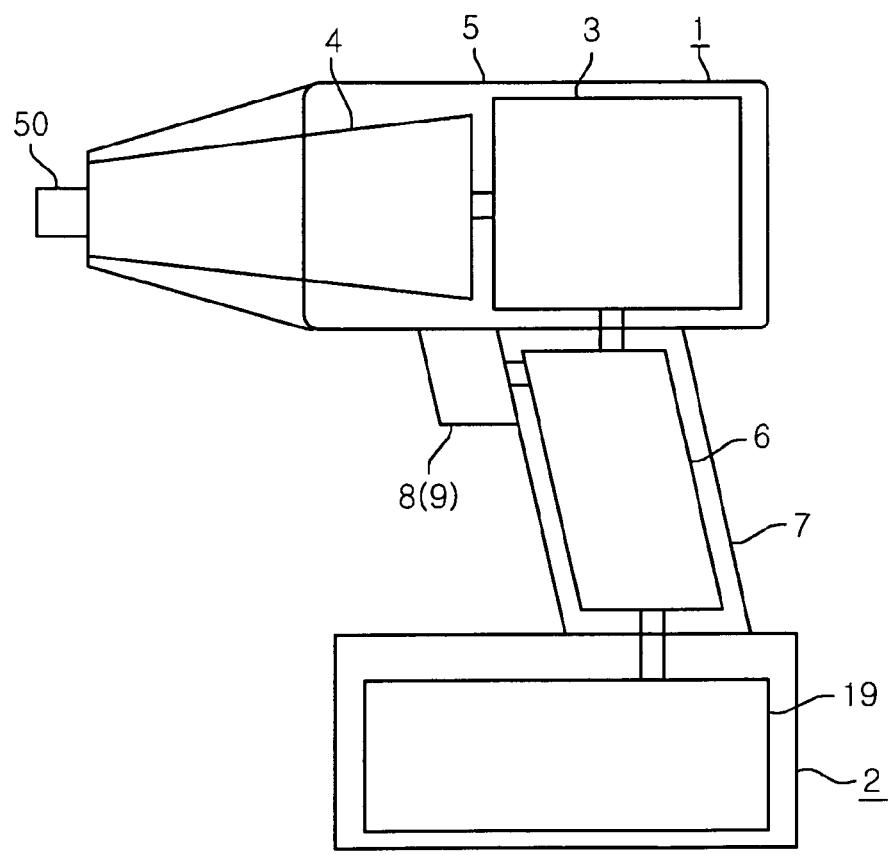
FIG. 2 is a schematic diagram showing the overall structure of the rotary tool shown in FIG. 1.

Embodiments of the present invention will be described with reference to the accompanying drawings which form a part hereof. FIGS. 1 and 2 show a rotary tool according to a first embodiment of the present invention.

The rotary tool of the present embodiment includes a tool body 1 and a battery pack 2 mounted to the tool body 1. The tool body 1 includes a hollow body portion 5 for holding a motor 3 and a power transfer block 4 therein and a handle portion 7 extending radially outwards from the hollow body portion 5 to hold a control unit 6 therein. A trigger switch 8 is attached to the handle portion 7 in a freely pulling manner.

The power transfer block 4 is composed of a speed reduction mechanism and an impact mechanism and is designed to transfer the rotation of the motor 3, i.e., the power source, to a tip (i.e., jaw) 50 of the rotary tool. The battery pack 2 holds therein a battery unit 19 formed of a secondary battery for feeding electric power to the motor 3. The battery pack 2 is removably mounted to the tip end of the handle portion 7.

The control unit 6 is connected to the motor 3 and the battery pack 2. The control unit 6 feeds the electric power of the battery pack 2 to the motor 3 in proportion to the pulling amount of the trigger switch 8, thereby performing the drive control of the motor 3 and hence the entire rotary tool.

In the present embodiment, the trigger switch 8 makes up an externally-operable operation switch 9. An on/off detection block 10 for detecting the on/off state of the trigger switch 8 and a pulling amount detection block 11 for detecting the pulling amount of the trigger switch 8 are held within the tool body 1 (see FIG. 1). The control unit 6 includes a FET control circuit 12 connected to the blocks 10 and 11 so that the FET control circuit 12 can control the rotation speed of the motor 3 in proportion to the pulling amount of the trigger switch 8.

In the tool body 1 of the present embodiment, there are provided a load detection unit 13 for detecting the load applied to the motor 3 and a residual power detection unit 14 for detecting the residual power of the battery pack 2.

The load detection unit 13 is composed of a drain voltage detection unit 15 arranged within the tool body 1 to detect the drain voltage of the FET control circuit 12. The drain voltage detection unit 15 is connected to the feedback circuit 16 of the control unit 6. The residual power detection unit 14 is connected to the FET control circuit 12 within the tool body 1.

In the tool body 1, there is also provided a display circuit 17 for externally displaying, e.g., the use state of the rotary tool through the use of LEDs. The display circuit 17 is connected to the FET control circuit 12. Within the battery pack 2, there is provided a battery state monitoring circuit unit 18 for monitoring the state of the battery unit 19. The battery state monitoring circuit unit 18 is connected to the FET control circuit 12 of the control unit 6 when the battery pack 2 is mounted to the tool body 1.

In the rotary tool of the present embodiment configured as above, if a user grips the handle portion 7 and pulls the trigger switch 8, the FET control circuit 12 of the control unit 6 feeds electric power to the motor 3 in response to the detection signal inputted from the on/off detection block 10 and the pulling amount detection block 11, thereby performing the operation control. By the term "operation control" used herein, it is meant that the motor is controlled so that the rotation speed thereof can become greater in proportion to the increase in the pulling amount of the trigger switch 8.

The feedback circuit 16 monitors the counter electromotive force of the motor 3 based on the detection result inputted from the drain voltage detection unit 15. The feedback circuit 16 controls the FET control circuit 12 so that the torque of the motor 3 can be increased when the counter electromotive force is high while the torque of the motor 3 can be reduced when the counter electromotive force is low. By providing the feedback circuit 16 in the control unit 6, the output power of the motor 3 is increased if the load of the motor 3 is high while the output power of the motor 3 is reduced if the load of the motor 3 is low. This realizes a feedback function for performing a smooth work.

In the control unit 6 of the present embodiment, the feedback control based on the drain voltage is inhibited during the time when the pulling amount of the trigger switch 8 is in a specified initial range (namely, until the detection value of the pulling amount detection block 11 becomes greater than a predetermined threshold value). This makes it possible to effectively prevent occurrence of a cogging phenomenon which would otherwise tend to occur during a load-free operation or a low-speed work. Needless to say, the feedback control is performed when the pulling amount of the trigger switch 8 exceeds the specified initial range (namely, when the detection value of the pulling amount detection block 11 becomes greater than the predetermined threshold value).

The control unit 6 of the present embodiment can be changed over not to perform the inhibition of the feedback control. More specifically, the inhibition of the feedback control is not performed if the residual power amount of the battery unit 19 detected by the residual power detection unit 14 is greater than a predetermined threshold value (e.g., 50% of the fully charged power amount). In other words, the feedback control is performed regardless of the pulling amount of the trigger switch 8. If the residual power amount of the battery unit 19 becomes equal to or smaller than the threshold value, the control unit 6 performs the inhibition of the feedback control. In other words, the control unit 6 controls the motor 3 so that the feedback control cannot be performed during the time when the pulling amount of the trigger switch 8 is in the initial range. The threshold value of the residual power amount of the battery unit 19 is set by, e.g., preliminarily storing a table in the microcomputer of the FET control circuit 12.

In case where the residual power amount is low, the voltage drop during rotation of the motor 3 gets greater, thereby increasing the likelihood of generation of cogging torque. In contrast, the cogging torque is hard to generate if the residual power amount is high. Therefore, the generation of the cogging torque can be efficiently prevented by making sure that, as set forth above, the feedback control is inhibited only when the residual power amount is low.

The threshold value A used in converting the feedback inhibition zone to the feedback permission zone when the trigger switch 8 is pulled may not be equal to the threshold value B used in converting the feedback permission zone to the feedback inhibition zone when the trigger switch 8 is released. That is to say, it may be desirable that the threshold value A is greater than or smaller than the threshold value B and not equal to the threshold value B.

Figure 3:
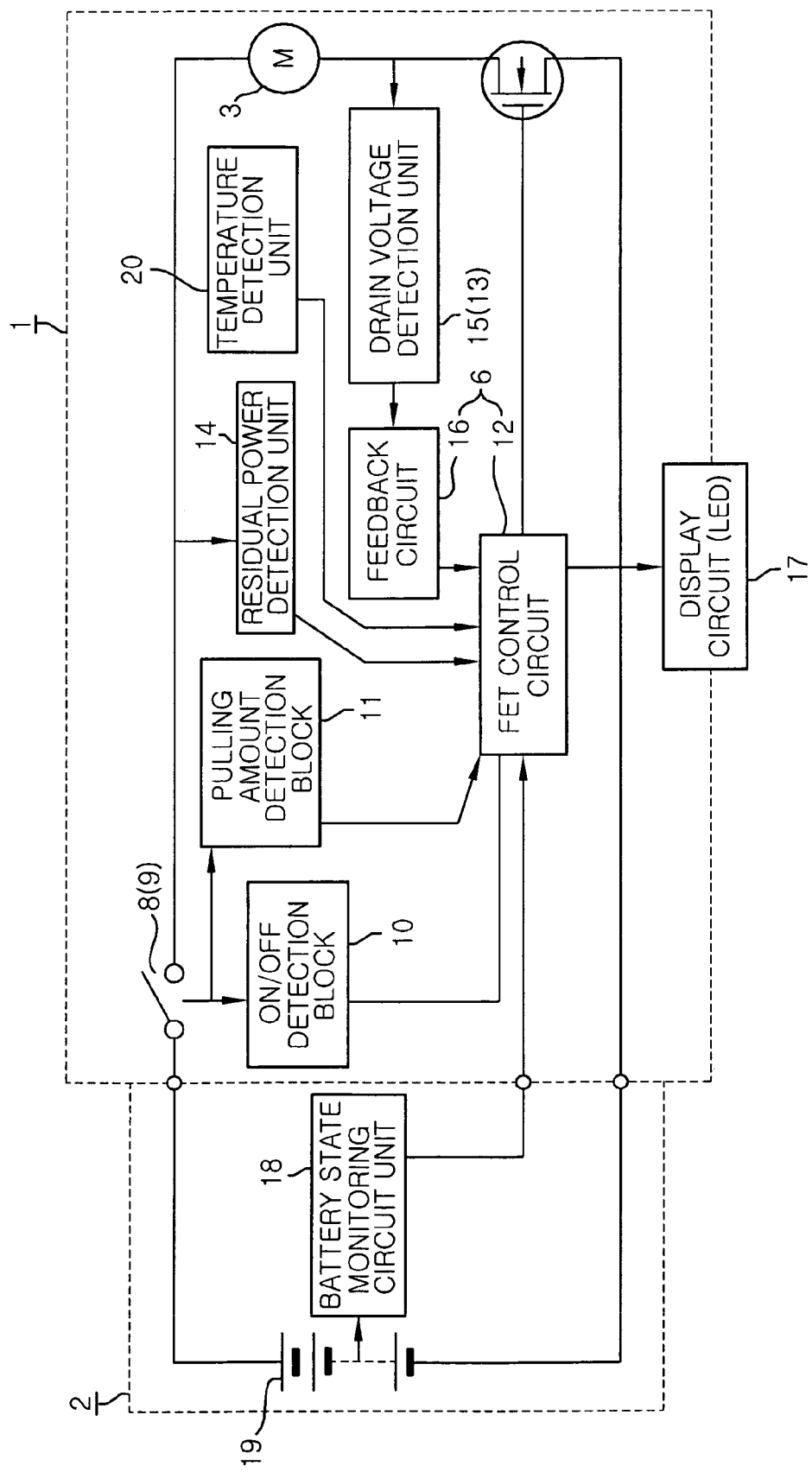
FIG. 3 is a circuit block diagram showing a rotary tool according to a second embodiment of the present invention.

Next, a rotary tool according to a second embodiment of the present invention will be described with reference to FIG. 3. The same configurations as those of the first embodiment will not be described in detail and the characteristic configurations differing from those of the first embodiment will be described below.

In the rotary tool of the present embodiment, a temperature detection unit 20 for detecting the temperature of the power transfer block 4 is built in the tool body 1. The temperature detection unit 20 is composed of a temperature detection element such as a thermistor or the like. The temperature detection unit 20 outputs a detection signal to the FET control circuit 12 of the control unit 6. The temperature detection unit 20 is not limited to the type that directly detects the temperature of the power transfer block 4 but may be of the type that indirectly detects the temperature of the power transfer block 4 by detecting the temperature of other parts, e.g., the external portion of the motor 3.

The inhibition of the feedback control is not performed if the temperature detected by the temperature detection unit 20 is greater than a predetermined threshold value (e.g., 5° C.). In other words, the feedback control is performed regardless of the pulling amount of the trigger switch 8. If the temperature becomes equal to or smaller than the threshold value, the control unit 6 performs the inhibition of the feedback control. In other words, the control unit 6 controls the motor 3 so that the feedback control cannot be performed during the time when the pulling amount of the trigger switch 8 is in the initial range.

Oil is applied to the relevant portions of the power transfer block 4 and the viscosity of the oil is kept high at a low temperature. Therefore, a large current is needed when the motor 3 makes initial rotation. Particularly if the power transfer block 4 is a hydraulic impact mechanism filled with a relatively large quantity of oil, this phenomenon becomes prominent. For that reason, the cogging torque is likely to generate at a low temperature but hard to generate at a high temperature. Accordingly, the generation of the cogging torque can be efficiently prevented by inhibiting the feedback control only when the detected temperature is low as mentioned earlier.

Figure 4:
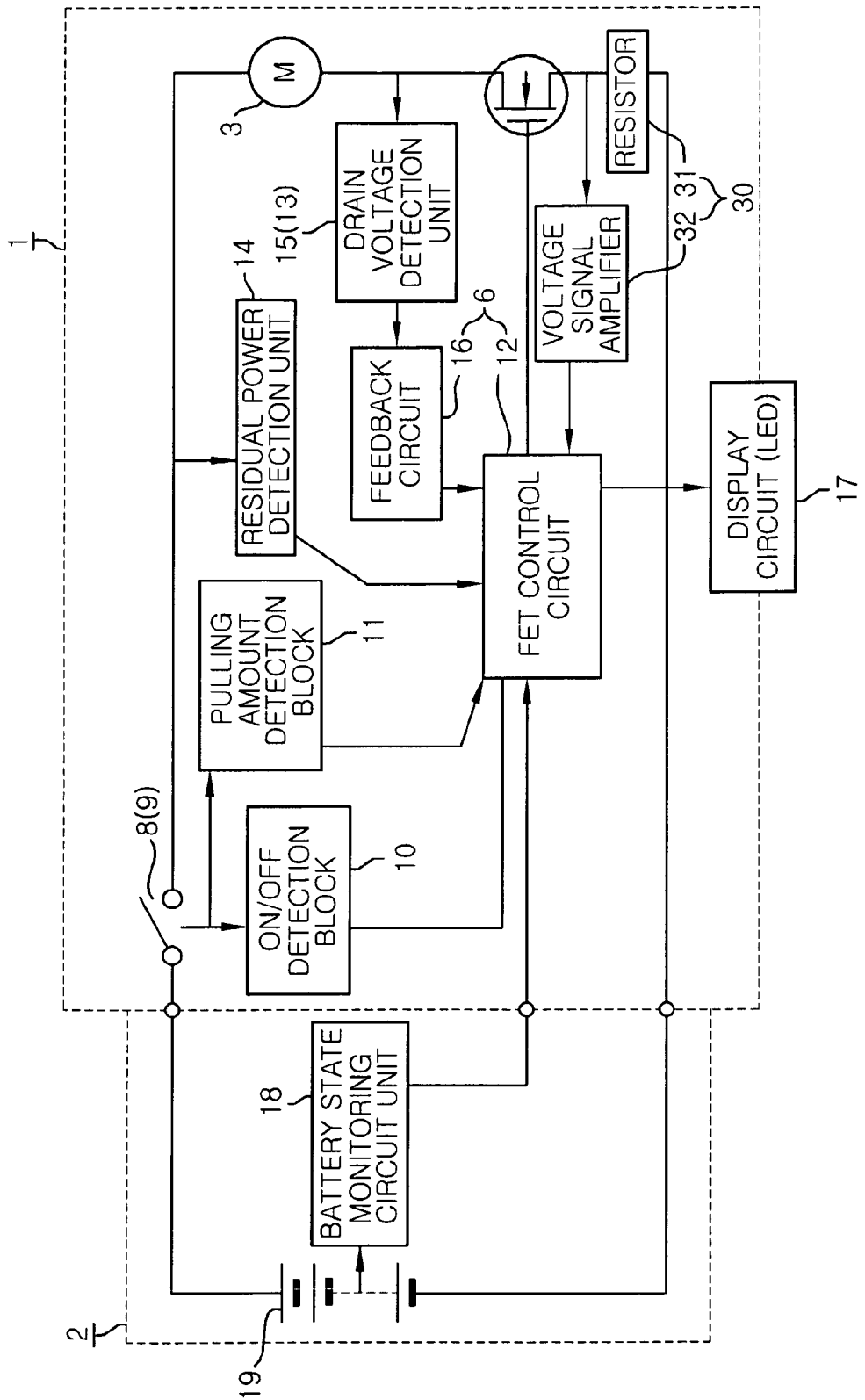
FIG. 4 is a circuit block diagram showing a rotary tool according to a third embodiment of the present invention.

Next, a rotary tool according to a third embodiment of the present invention will be described with reference to FIG. 4. The same configurations as those of the first embodiment will not be described in detail and the characteristic configurations differing from those of the first embodiment will be described below.

In the rotary tool of the present embodiment, a current detection unit 30 for detecting the electric current flowing through the motor 3 is built in the tool body 1. The current detection unit 30 includes a resistor 31 of small resistance value (about several mQ) interposed between the battery unit 19 and the motor 3 and a voltage signal amplifier 32 for amplifying the voltage applied between the opposite ends of the resistor 31. The current detection unit 30 is connected to the FET control circuit 12.

The inhibition of the feedback control is not performed if the current detected by the current detection unit 30 is greater than a predetermined threshold value. In other words, the feedback control is performed regardless of the pulling amount of the trigger switch 8. If the current becomes equal to or smaller than the threshold value, the control unit 6 performs the inhibition of the feedback control. In other words, the control unit 6 controls the motor 3 so that the feedback control cannot be performed during the time when the pulling amount of the trigger switch 8 is in the initial range. This setting makes it possible to efficiently prevent generation of the cogging torque.

Next, description will be made on a rotary tool according to a fourth embodiment of the present invention. The same configurations as those of the first embodiment will not be described in detail and the characteristic configurations differing from those of the first embodiment will be described below.

In the rotary tool of the present embodiment, a mode changeover switch (not shown) for changing over a high-speed mode and a low-speed mode is provided in the tool body 1. The rotation speed of the motor 3 is different in the high-speed mode and the low-speed mode even if the pulling amount of the trigger switch 8 remains the same. In other words, the rotation speed of the motor 3 for the same pulling amount of the trigger switch 8 is greater in the high-speed mode than in the low-speed mode.

The inhibition of the feedback control is not performed if the rotary tool is in the high-speed mode. In other words, the feedback control is performed regardless of the pulling amount of the trigger switch 8. If the rotary tool is in the low-speed mode, the control unit 6 performs the inhibition of the feedback control. In other words, the control unit 6 controls the motor 3 so that the feedback control cannot be performed during the time when the pulling amount of the trigger switch 8 is in the initial range. This setting makes it possible to efficiently prevent generation of the cogging torque.

While certain embodiments of the present invention have been described hereinabove, the present invention is not limited to these embodiments. The respective embodiments may be properly modified in design and may be appropriately combined without departing from the scope of the invention.

While the invention has been shown and described with respect to the embodiments, it will be understood by those skilled in the art that various changes and modification may be made without departing from the scope of the invention as defined in the following claims.

What is claimed is:

1. A rotary tool, comprising:
an externally operable operation switch;
a motor serving as a power source;
a power transfer block for transferring the rotation of the motor;
a load detection unit for detecting an amount of load of the motor; and
a control unit for controlling the motor,
wherein the control unit is configured to perform an operation control by which the motor is controlled so that a rotation speed of the motor is increased in proportion to the operation amount of the operation switch and a feedback control by which the rotation speed of the motor is controlled depending on the detection result of the load detection unit, the control unit inhibiting the feedback control during the time when the operation amount of the operation switch is equal to or less than a threshold and performing the feedback control only when the operation amount of the operation switch is greater than the threshold,
wherein the rotation speed of the motor is controlled to be proportional to the amount of the load of the motor by the feedback control.

2. The rotary tool of claim 1, further comprising a battery unit configured to supply electric power to the motor and a residual power detection unit configured to detect a residual power amount of the battery unit, the control unit being configured not to perform the inhibition of the feedback control if the residual power amount detected by the residual power detection unit is greater than a threshold value.

3. The rotary tool of claim 2, further comprising a temperature detection unit configured to detect a temperature of the power transfer block, the control unit being configured not to perform the inhibition of the feedback control if the temperature detected by the temperature detection unit is greater than a threshold temperature.

4. The rotary tool of claim 3, wherein the control unit includes a high-speed mode and a low-speed mode in which a rotation speed of the motor is greater in the high-speed mode than in the low-speed mode for a same pulling amount of the operation switch, the control unit being configured not to perform the inhibition of the feedback control when in the high-speed mode.

5. The rotary tool of claim 4, wherein the threshold is greater than zero.

6. The rotary tool of claim 2, wherein the control unit includes a high-speed mode and a low-speed mode in which a rotation speed of the motor is greater in the high-speed mode than in the low-speed mode for a same pulling amount of the operation switch, the control unit being configured not to perform the inhibition of the feedback control when in the high-speed mode.

7. The rotary tool of claim 2, wherein the threshold is greater than zero.

8. The rotary tool of claim 1, further comprising a temperature detection unit configured to detect a temperature of the power transfer block, the control unit being configured not to perform the inhibition of the feedback control if the temperature detected by the temperature detection unit is greater than a threshold temperature.

9. The rotary tool of claim 8, wherein the control unit includes a high-speed mode and a low-speed mode in which a rotation speed of the motor is greater in the high-speed mode than in the low-speed mode for a same pulling amount of the operation switch, the control unit being configured not to perform the inhibition of the feedback control when in the high-speed mode.

10. The rotary tool of claim 8, wherein the threshold is greater than zero.

11. The rotary tool of claim 1, wherein the control unit includes a high-speed mode and a low-speed mode in which a rotation speed of the motor is greater in the high-speed mode than in the low-speed mode for a same pulling amount of the operation switch, the control unit being configured not to perform the inhibition of the feedback control when in the high-speed mode.

12. The rotary tool of claim 11, wherein the threshold is greater than zero.

13. The rotary tool of claim 1, wherein the threshold is greater than zero.

* * * * *